May 24, 1927.                         1,630,007
R. HILL
TEMPERATURE INDICATOR
Filed Nov. 14, 1925
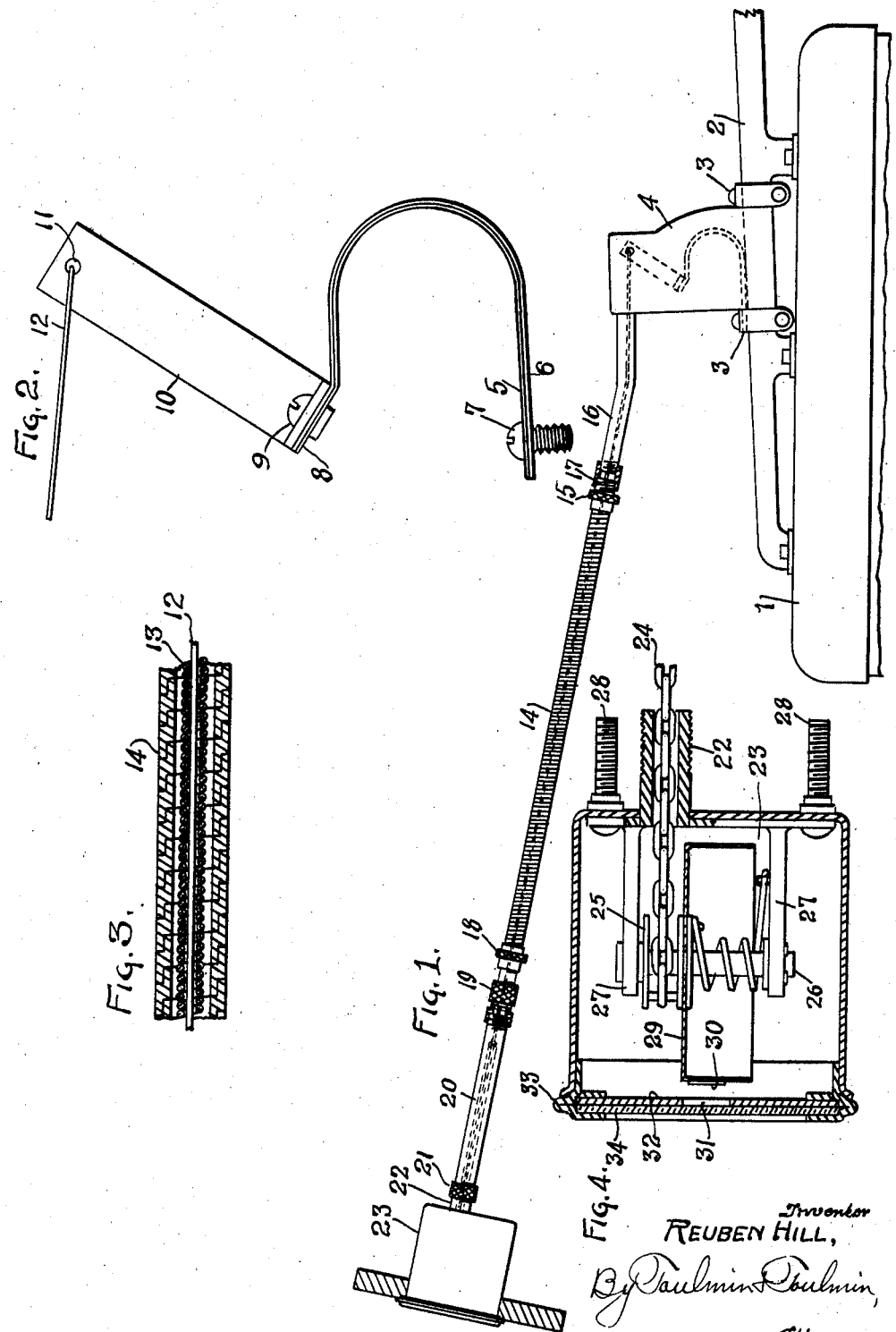

Patented May 24, 1927.

1,630,007

UNITED STATES PATENT OFFICE.

REUBEN HILL, OF WEST HARTFORD, CONNECTICUT, ASSIGNOR TO THE GROLAN MANUFACTURING COMPANY, OF DAYTON, OHIO, A CORPORATION OF DELAWARE.

TEMPERATURE INDICATOR.

Application filed November 14, 1925. Serial No. 69,185.

My invention relates to temperature indicators and particularly to a mechanically-operated temperature indicator.

It is the object of my invention to provide a mechanically-operated temperature indicator which will indicate directly on the dash board of a vehicle at a point relatively remote from the motor or other apparatus, the temperature of which is being indicated, the exact temperature of such motor or other apparatus, or the fluid contents thereof.

It is a further object of my invention to provide an apparatus of this character which may be installed on existing motor cars, if desired, in the nature of an accessory.

It is a further object to provide a temperature indicator having an element which will expand or contract according to the temperature of the body to which it is attached and to that element, it is my object to connect a very fine flexible connecting means which passes through a guiding and protecting tube relatively close fitting of flexible character to an indicator head on the dash board of a vehicle where it will actuate the indicating mechanism in such indicator for showing the exact temperature of the body to which the actuating means is attached.

It is thus my object to eliminate difficulties of seeing the remote temperature indicators and to eliminate indicators using columns of liquid or like devices which are attached to a water system of a vehicle preferably on a vehicle.

It is my further object to provide an apparatus which need not disturb the existing motor and which need not be brought in contact with the liquid in the motor or vapor therefrom in order to operate it.

In the accompanying drawings:

Figure 1 is a side elevation of the complete installation of my temperature indicator unit;

Figure 2 is an enlarged plan view with the cover removed of the temperature control actuating end of the temperature gauge;

Figure 3 is a section through the actuating and protecting casing;

Figure 4 is a section through the indicator head.

Referring to the drawings in detail, 1 is a motor on which is mounted the conventional water manifold 2 to which is clamped by the clamps 3 a housing 4 in which is located the temperature operated means for actuating the indicator on the dash board of a vehicle.

This temperature operated means consists of a U-shaped piece of two different metals, known as a bi-metallic member such two materials being indicated as 5 and 6. Such metals are joined together to form a single strip, one end of which is mounted on its flat portion on top of the manifold 2 by a set screw 7. The other end of this strip is bent at an angle as at 8 and has connected thereon by a screw 9 a lever 10 at the upper end of which in the eye 11 is attached a fine communicating wire 12. This wire passes through a flexible, closely-fitting guide tube 13 and a relatively large, heavy, protecting, flexible tube 14 which is mounted on the outside of the tube 13. Before reaching such tubes which terminate in a knurled member 15, the fine wire passes through a metallic tube 16 connected to the housing 4 which has a threaded sleeve member 17 for receiving the knurled member 15.

The dash board end of these flexible tubes are connected by a collar 18 to a knurled member 19 which is threaded upon the threaded end of a metallic tube 20 which is connected by a knurled member 21 to the sleeve 22 on the housing 23 of the indicator casing. Within this tube 20 and passing into the indicator housing through the sleeve 22 is a fine chain 24 connected at the rear end of the wire 12. This chain passes over a grooved pulley 25 carried on a shaft 26 in the arms 27 of a bracket. This bracket is attached by the screws 28 to the casing 23 of the indicator. This grooved pulley 25 carries with it on the shaft 26 an indicating drum 29 on the face of which are designations 30 for indicating the temperature through the aperture 31 of a plate 32 held by a bezel ring 33 beneath a glass 34.

It will be thus observed that upon the heating of the bi-metallic element or the cooling of it, the difference in expansion and contraction of the two metals will cause a movement of the free end 8 of the bi-metallic element thus moving the lever 10 and actuating the wire 12 which will, in turn, move the drum 29 to display the proper temperature indication according to the calibration of the instrument.

It will be understood that I desire to comprehend within my invention such modifications as may be necessary to adapt it to varying conditions and uses.

Having thus fully described my invention, what I claim as new and desire to secure by Letters Patent, is:

1. In a temperature measuring instrument, a contracting and expanding temperature actuating means, one end of which is connected to the means the temperature of which is to be measured, and the other end of which is connected to a lever, a wire connected thereto and an indicator connected to said wire remotely from the lever, and yielding means in the indicator to maintain said wire taut and to yieldingly resist the movement of the temperature actuated means.

2. In a temperature measuring instrument, a contracting and expanding temperature actuating means, one end of which is connected to the means the temperature of which is to be measured, a lever connected to said temperature actuating means, a wire connected to said lever and an indicator connected to said wire remotely from the lever, and yielding means in the indicator to maintain said wire taut and to yieldingly resist the movement of the temperature actuated means, and a casing detachably mounted on said means whose temperature is to be indicated surrounding said temperature actuating means and lever and a portion of said wire, a guiding and protecting tube surrounding said wire connected thereto at one end and to the housing of the indicator at the other end, and a housing for said indicator.

3. In a temperature measuring instrument, a U-shaped bi-metallic element, one end of which is directly connected to a motor manifold, a lever carried by the other end of said bimetallic element, a wire connected at one end to said lever and at its other end to an indicator, an indicator consisting of a drum, a flexible means connected to said wire adapted to be wound on said drum, yieldable means to move said drum in one direction against the movement of said wire and means to conceal said means in the indicator, save a portion of the face of said drum.

4. In a temperature measuring instrument, a U-shaped bi-metallic element, one end of which is connected to a motor manifold, a lever carried by the other end of said bimetallic element, a wire connected at one end to said lever and at its other end to an indicator, an indicator consisting of a drum, a flexible means connected to said wire adapted to be wound to said drum, yielding means to move said drum in one direction against the movement of said wire and means to conceal said means in the indicator, save a portion of the face of said drum, and guiding and protecting means around said wire and a detachable housing for said temperature actuated means.

5. In a temperature measuring instrument, a U-shaped bi-metallic member adapted to be detachably mounted on a manifold, means for detachably so mounting it at one end, a bent end on the free end of said bimetallic element, a lever disposed at an angle vertically mounted on said free end, a fine wire connected to the free end of said lever at one end and to an indicating drum at the other, an indicating drum, a fine chain adapted to connect said wire to said drum, a pulley in which said chain operates, yielding means to maintain said drum yieldingly towards a given position against the movement of said bi-metallic member and a guiding and protecting means for said wire.

6. In a temperature indicator, a U-shaped bi-metallic element having one arm mounted on an engine and the other arm free to move, said free arm having an angular portion, a lever mounted thereon at an angle to the free arm of the U-shaped bi-metallic member, a relatively fine light wire connected to the free end of the lever at one end and to an indicator at the other, an indicator, yielding means in said indicator for maintaining said wire taut, a relatively close-fitting guiding means for said fine wire and a relatively close-fitting protecting cable for said close-fitting means.

In testimony whereof, I affix my signature.

REUBEN HILL.